United States Patent
Kirke

(10) Patent No.: US 9,112,872 B2
(45) Date of Patent: *Aug. 18, 2015

(54) METHOD AND SYSTEM FOR COMMUNICATION OF INFORMATION BY A HANDHELD COMMUNICATION DEVICE IN AN AD-HOC NETWORK

(75) Inventor: Tony Kirke, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 1601 days.

This patent is subject to a terminal disclaimer.

(21) Appl. No.: 11/422,637

(22) Filed: Jun. 7, 2006

(65) Prior Publication Data

US 2007/0286113 A1    Dec. 13, 2007

(51) Int. Cl.
*H04M 3/42* (2006.01)
*H04L 29/06* (2006.01)
*H04W 12/08* (2009.01)
*H04W 8/00* (2009.01)
*H04L 29/08* (2006.01)

(52) U.S. Cl.
CPC ............ *H04L 63/101* (2013.01); *H04W 12/08* (2013.01); *H04L 67/303* (2013.01); *H04W 8/005* (2013.01)

(58) Field of Classification Search
USPC .......... 455/411, 410, 414, 518, 414.1, 414.2, 455/456.1, 456.3
See application file for complete search history.

(56) References Cited

U.S. PATENT DOCUMENTS

| | | | |
|---|---|---|---|
| 7,149,534 B2 * | 12/2006 | Bloebaum et al. | 455/456.6 |
| 7,826,603 B1 * | 11/2010 | Denman et al. | 379/202.01 |
| 7,840,224 B2 * | 11/2010 | Vengroff et al. | 455/456.1 |
| 2002/0132582 A1 | 9/2002 | Mooney | |
| 2003/0045272 A1 * | 3/2003 | Burr | 455/411 |
| 2004/0198220 A1 * | 10/2004 | Whelan et al. | 455/41.1 |
| 2007/0197250 A1 * | 8/2007 | Kies et al. | 455/518 |
| 2007/0202906 A1 * | 8/2007 | Lindner | 455/518 |
| 2007/0286133 A1 * | 12/2007 | Kirke | 370/338 |

FOREIGN PATENT DOCUMENTS

CN         1430339         7/2003

* cited by examiner

*Primary Examiner* — Blane J Jackson
(74) *Attorney, Agent, or Firm* — Garlick & Markison; Bruce E. Garlick

(57) ABSTRACT

Methods and systems for communicating information by a communication device are disclosed and may include detecting a second handheld communication device that is within range of a first handheld communication device. It may be determined whether the second handheld communication device is authorized to communicate with the first handheld communication device, based on a list of authorized devices. The list of devices may be maintained at the first handheld communication device and may be created prior to the detecting and any prior communication between the first handheld communication device and the second handheld communication device. If the second handheld communication device is authorized, a direct communication link may be established between the first handheld communication device and the second handheld communication device. The link may be established without using an intermediate communication device that includes a bridging function, a routing function, and/or a switching function.

24 Claims, 7 Drawing Sheets

METHOD AND SYSTEM FOR COMMUNICATION OF INFORMATION BY A HANDHELD COMMUNICATION DEVICE IN AN AD-HOC NETWORK

CROSS-REFERENCE TO RELATED APPLICATIONS/INCORPORATION BY REFERENCE

This application makes reference to:
U.S. patent application Ser. No. 11/422,638 filed on Jun. 7, 2006;
U.S. patent application Ser. No. 11/422,640 filed on Jun. 7, 2006;
U.S. patent application Ser. No. 11/422,645 filed on Jun. 7, 2006;
U.S. patent application Ser. No. 11/422,649 filed on Jun. 7, 2006;
U.S. patent application Ser. No. 11/422,657 filed on Jun. 7, 2006; and
U.S. patent application Ser. No. 11/422,664 filed on Jun. 7, 2006.

Each of the above stated applications is hereby incorporated herein by reference in its entirety.

FIELD OF THE INVENTION

Certain embodiments of the invention relate to communication of information within a network. More specifically, certain embodiments of the invention relate to a method and system for communication of information by a handheld communication device in an ad-hoc network.

BACKGROUND OF THE INVENTION

Wireless technology is revolutionizing personal connectivity by providing freedom from wired connections. Conventional wireless connectivity protocols for handheld communication devices, such as Bluetooth®, may provide a small form-factor, low-cost radio solution which may support links between computers, mobile phones and/or other portable and handheld communication devices. Bluetooth® wireless technology is an international, open standard for allowing intelligent devices to communicate with each other through wireless, short-range communications. The Bluetooth® technology allows a Bluetooth® compliant device, such as a Bluetooth®-enabled computer, computer mouse, computer keyboard, speakers, or a handheld communication device, for example, to support its own connections, without wires, cables or any direct action from a user. Bluetooth® is currently incorporated into numerous commercial products including laptops, PDAs, cell phones, keyboards, and printers, for example.

Bluetooth® handheld communication devices, such as mobile telephones and PDAs, are evolving to become more complex as such devices may be adapted to transmit and receive audio and/or video information. However, communicating data, such as audio and video data between Bluetooth®-enabled devices via a Bluetooth® connection requires increased power consumption and may be achieved at data rates that are slower than data rates offered by high-speed connections. Furthermore, conventional wireless connectivity standards for handheld communication devices, such as the Bluetooth® standard, are effective within a limited distance range.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for communication of information by a handheld communication device in an ad-hoc network, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for communication of information by a handheld communication device in an ad-hoc network. In one embodiment of the invention, a first handheld communication device may detect whether a second handheld communication device is within range of the first handheld communication device. The first handheld communication device may determine whether the second handheld communication device is authorized to communicate with the first handheld communication device, based on a list of authorized devices. The list of authorized devices may be maintained at the first handheld communication device and may be created prior to the detecting and any prior communication between the first handheld communication device and the second handheld communication device. If the second handheld communication device is authorized, a direct communication link may be established between the first handheld communication device and the second handheld communication device. The link may be established without using an intermediate communication device that comprises a bridging function, a routing function, and/or a switching function. The intermediate communication device may facilitate communication between the first and the second handheld communication devices.

The intermediate communication device may comprise a network server. The first handheld communication device may determine whether the list of authorized devices comprises the second handheld communication device. If the second handheld communication device is not authorized, profile information for the second handheld communication device may be acquired. The acquired profile information may be displayed at the first handheld communication device, which may be part of an infrastructure network. The first handheld communication device may determine whether to add the non-authorized second handheld communication device to the list of authorized devices, based on the acquired profile information. The acquired profile information may comprise device identification information and/or user identification information. The established communication link may comprise a wireless communication link for communicating voice signals, video signals, and/or data signals. In this regard, the first handheld communication device and the second handheld communication device may establish an ad-hoc network and may communicate information, such as data and voice information, at distances that may exceed the operating range of a Bluetooth® connection.

Figure 1:
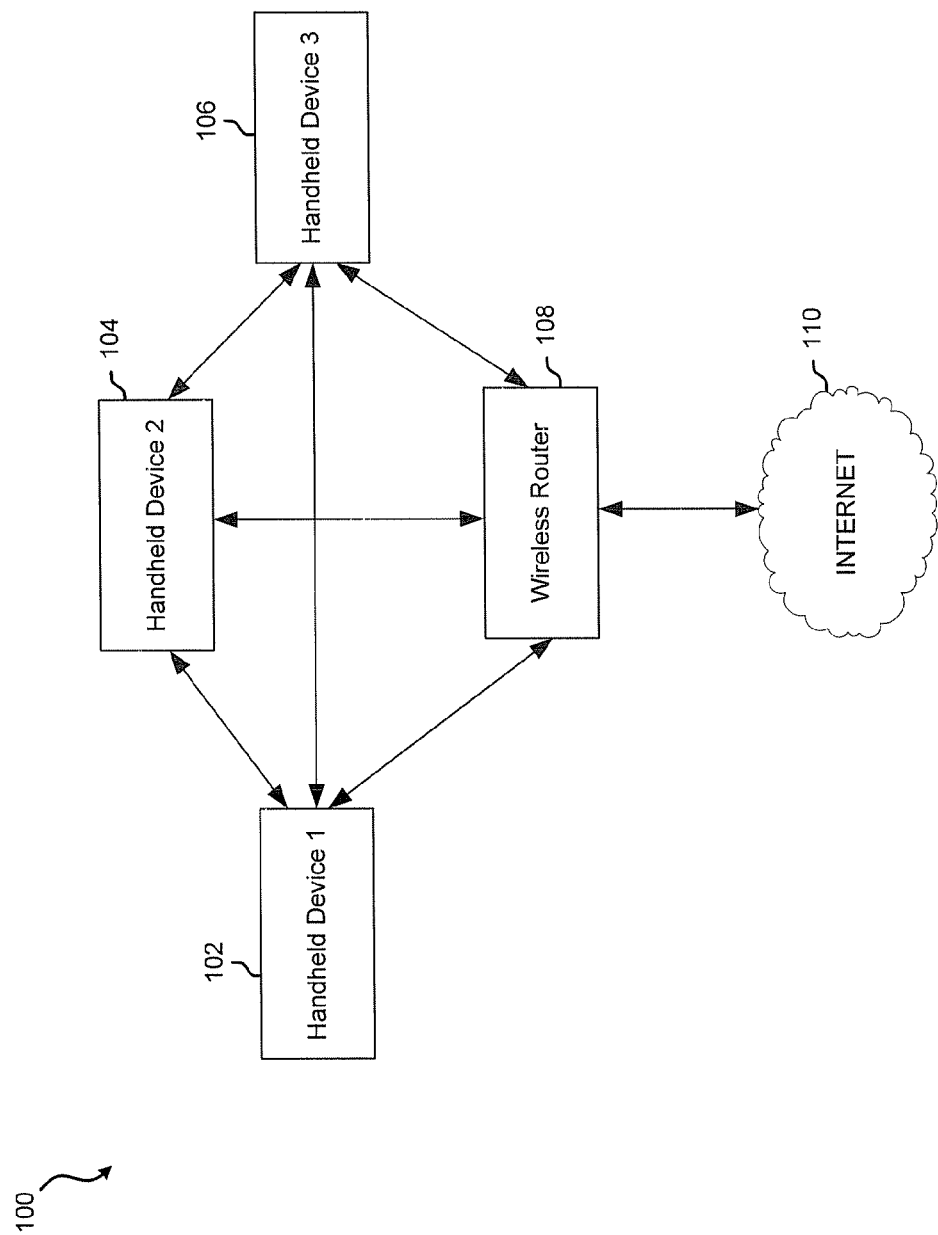
FIG. 1 is a diagram illustrating communication between a plurality of handheld communication devices in an ad-hoc network, in accordance with an embodiment of the invention.

FIG. 1 is a diagram illustrating communication between a plurality of handheld communication devices in an ad-hoc network, in accordance with an embodiment of the invention. Referring to FIG. 1, the ad-hoc network 100 may comprise a plurality of handheld communication devices, such as handheld communication devices 102, 104, and 106. The handheld communication devices 102, 104, and 106 may each comprise suitable circuitry, logic, and/or code and may communicate information wirelessly within the ad-hoc network 100. For example, handheld communication devices 102, 104, and 106 may communicate voice or data between each other over extended ranges, without the use of a network device, such as an access point, a base station, a bridge, a router, and/or a switch, for example, to facilitate such communication. The extended range may be much greater than the range provided by Bluetooth.

In one embodiment of the invention, handheld communication devices 102, 104, and 106 may utilize instant messaging (IM) to communicate data within the ad-hoc network 100. For example, during an initial formation of the ad-hoc network 100, the handheld communication device 102 may detect the presence of the handheld communication device 104. Handheld communication devices 102 and 104 may then exchange identification information related to the devices 102 and 104 and/or to the corresponding users of the devices 102 and 104. For example, handheld communication devices 102 and 104 may exchange user identification information. After handheld communication devices 102 and 104 exchange user identification information and authenticate each other, a connection may be established for a wireless exchange of data between the handheld communication devices 102 and 104. In one embodiment of the invention, the connection may be utilized to filtrate a messaging session such as, for example, an instant messaging session between devices.

After an IM wireless connection is established between handheld communication devices 102 and 104, a third handheld communication device 106, located within operating range of handheld communication devices 102 and 104, may be detected by device 102 and/or device 104. After handheld communication device 106 is detected by handheld communication device 102 and/or handheld communication device 104, identification information may be exchanged between handheld communication device 106 and handheld communication devices 102 and 104. Handheld communication device 106 may then be accepted within the ad-hoc network 100 and IM communication may be established between handheld communication devices 102, 104, and 106.

In another embodiment of the invention, handheld communication devices 102, 104, and 106 may each communicate with the wireless router 108. The wireless router 108 may be communicatively coupled to the Internet 110. In this regard, one or more of the handheld communication devices 102, 104, and 106 may operate both within the ad-hoc network 100 and within an infrastructure network comprising, for example, the router 108 and one or more devices communicatively coupled to the Internet 110.

Figure 2:
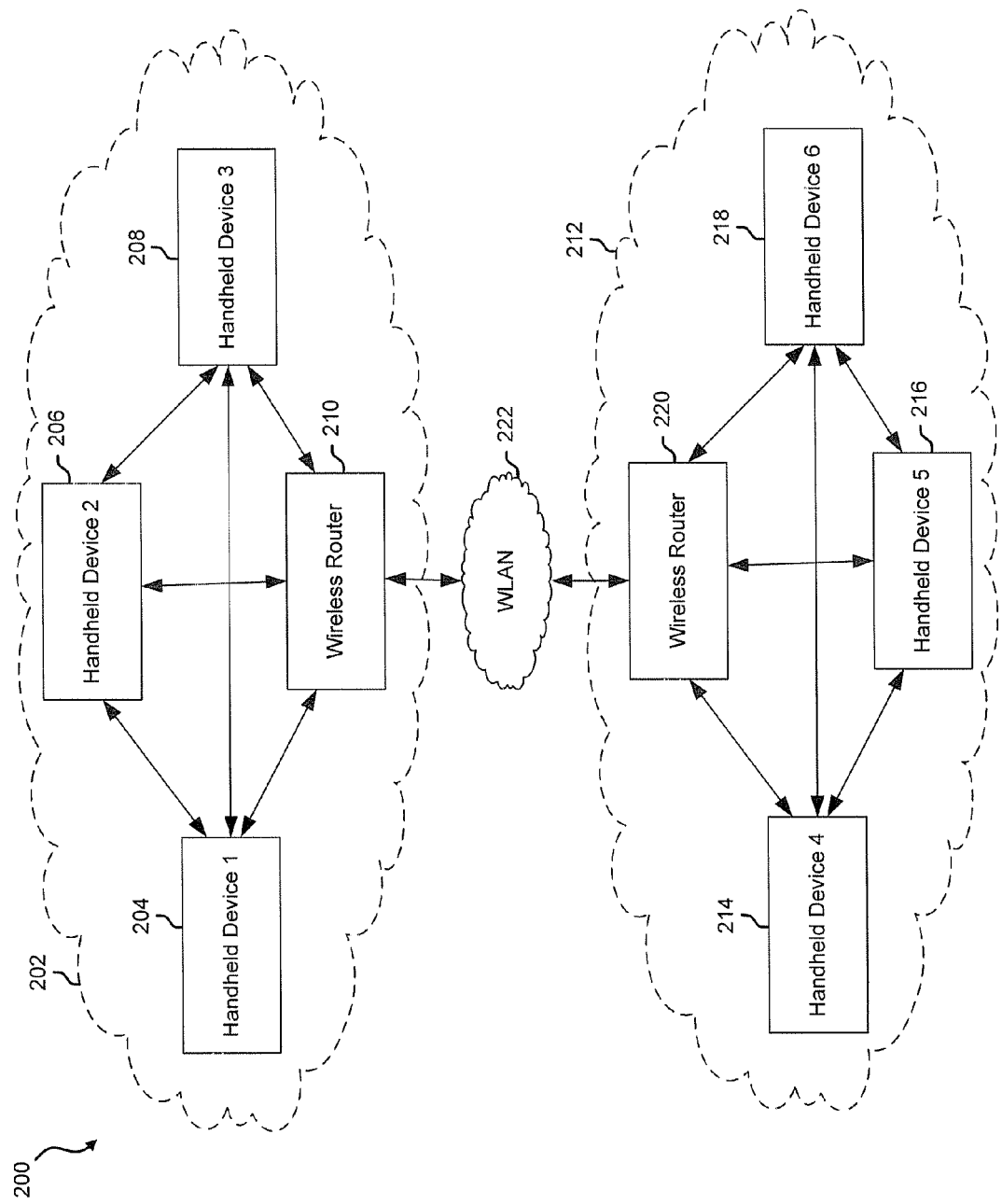
FIG. 2 is a diagram illustrating a plurality of ad-hoc networks comprising handheld communication devices, in accordance with an embodiment of the invention.

FIG. 2 is a diagram illustrating a plurality of ad-hoc networks comprising handheld communication devices, in accordance with an embodiment of the invention. Referring to FIG. 2, the communication infrastructure 200 may comprise ad-hoc networks 202 and 212. The ad-hoc network 202 may comprise a plurality of handheld communication devices, such as handheld communication devices 204, 206, and 208. The handheld communication devices 204, 206, and 208 may each comprise suitable circuitry, logic, and/or code and may communicate information wirelessly over an extended range within the ad-hoc network 202. For example, handheld communication devices 204, 206, and 208 may communicate voice or data between each other over extended ranges, without the use of a network device, such as an access point, a base station, a bridge, a router, and/or a switch, for example, to facilitate such communication. The extended range may be much greater than the range provided by Bluetooth.

Similarly, the ad-hoc network 212 may comprise a plurality of handheld communication devices, such as handheld communication devices 214, 216, and 218. The handheld communication devices 214, 216, and 218 may each comprise suitable circuitry, logic, and/or code and may communicate information wirelessly within the ad-hoc network 212. For example, handheld communication devices 214, 216, and 218 may communicate voice or data between each other over extended ranges, without the use of a network device, such as an access point, a base station, a bridge, a router, and/or a switch, for example, to facilitate such communication. The extended ranges may be much greater than the range provided by Bluetooth.

In one exemplary embodiment of the invention, handheld communication devices 204, 206, and 208 may utilize instant messaging (IM) to wirelessly communicate data over an extended range within the ad-hoc network 202 when the devices are within operating range of each other. Similarly, handheld communication devices 214, 216, and 218 may utilize, for example, instant messaging (IM) to communicate data within the ad-hoc network 212. One or more of the handheld communication devices 204, 206, and 208, within ad-hoc network 202, and handheld communication devices 214, 216, and 218, within ad-hoc network 212, may communicate with the wireless routers 210 and 220, respectively. The wireless routers 210 and 220 may be communicatively coupled to a wireless local area network (WLAN) 222. In this regard, one or more of the handheld communication devices 204, . . . , 208 may simultaneously communicate information to one or more handheld communication devices within the ad-hoc network 202, and to one or more handheld communication device within the ad-hoc network 212, via the wireless routers 210, 220 and the WLAN 222. Similarly, one or more of the handheld communication devices 214, . . . , 218 may communicate information within the ad-hoc network 212 and with one or more handheld communication device within the ad-hoc network 202, via the wireless routers 210, 220 and the WLAN 222.

Figure 3:
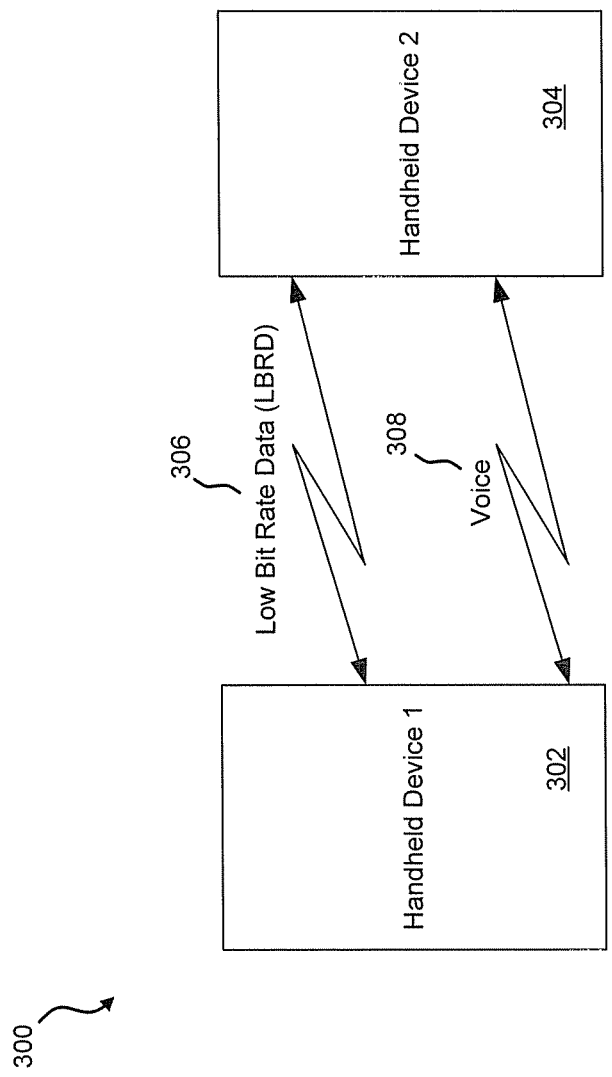
FIG. 3 is a diagram illustrating communication of information between handheld communication devices, in accordance with an embodiment of the invention.

FIG. 3 is a diagram illustrating communication of information between handheld communication devices, in accordance with an embodiment of the invention. Referring to FIG. 3, handheld communication devices 302 and 304 may form an ad-hoc network 300. In this regard, handheld communication devices 302 and 304 may exchange information without using an intermediate communication device, such as an access point, a base station, a bridge, a router, and/or a switch that facilitates communication between the handheld communication devices 302 and 304. The handheld communication devices 302 and 304 may comprise, for example, a cell phone or a personal digital assistant (PDA). Furthermore, the handheld communication devices 302 and 304 may communicate low bit-rate data (LBRD) 306 and/or voice data 308. The LBRD 306 may be exchanged during, for example, an instant messaging (IM) connection established between the handheld communication devices 302 and 304.

In operation, the handheld communication device 302 may detect the presence of the handheld communication device 304 when the latter is within operating range of the former. Handheld communication devices 302 and 304 may then exchange identification information related to the devices 302 and 304 and/or identification information related to the corresponding users of the devices 302 and 304. After handheld communication devices 302 and 304 exchange user identification information and authenticate each other, a connection may be established between handheld communication devices 302 and 304 for a wireless exchange of LBRD 306 and/or exchange of voice information 308.

Figure 4:
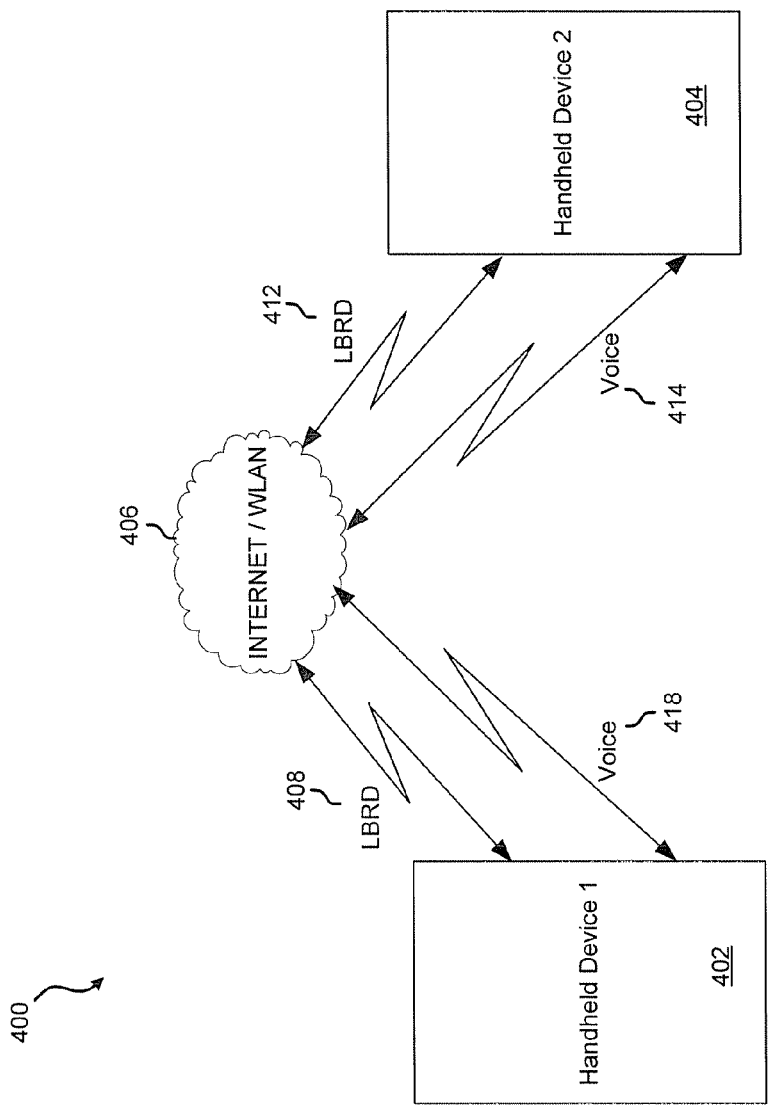
FIG. 4 is a diagram illustrating communication of information between handheld communication devices, in accordance with an embodiment of the invention.

FIG. 4 is a diagram illustrating communication of information between handheld communication devices, in accordance with an embodiment of the invention. Referring to FIG. 4, handheld communication devices 402 and 404 may form a communication infrastructure 400. The communication infrastructure 400 may also comprise the Internet or a WLAN 406. The handheld communication devices 402 and 404 may exchange information via the Internet or WLAN 406. The handheld communication devices 402 and 404 may comprise, for example, a cell phone or a personal digital assistant (PDA). Furthermore, the handheld communication devices 402 and 404 may communicate low bit-rate data (LBRD) 408 and 412 and/or voice data 418 and 414.

For example, LBRD 408 may be communicated between the Internet/WLAN 406 and the handheld communication device 402, and LBRD 412 may be communicated between the Internet/WLAN 406 and the handheld communication device 404. Similarly, voice data 418 may be communicated between the Internet/WLAN 406 and the handheld communication device 402, and voice data 414 may be communicated between the Internet/WLAN 406 and the handheld communication device 404. The LBRD 408 and 412 may be exchanged during, for example, an instant messaging (IM) connection established between the handheld communication devices 402 and 404 via the Internet/WLAN 406.

In operation, the handheld communication device 402 may detect the presence of the handheld communication device 404 via the Internet/WLAN 406. Handheld communication devices 402 and 404 may then exchange identification information related to the devices 402 and 404 and/or identification information related to the corresponding users of the handheld communication devices 402 and 404. After handheld communication devices 402 and 404 exchange user identification information and authenticate each other, a connection may be established between handheld communication devices 406 and 408 via the Internet/WLAN 406 for a wireless exchange of LBRD 408 and 412 and/or exchange of voice information 418 and 414.

In one embodiment of the invention, handheld communication device 402 may store identification information of handheld communication device 404, prior to pairing the devices 402 and 404 or prior to establishing any connection or communication between the devices 402 and 404 when the latter is within operating range of the former. In this regard, handheld communication device 404 may be "pre-authorized" to communicate with handheld communication device 402. In instances when handheld communication device 404 is pre-authorized for communication with handheld communication device 402, an ad-hoc network connection may be established between devices 402 and 404 at the time handheld communication device 402 detects handheld communication device 404.

Figure 5:
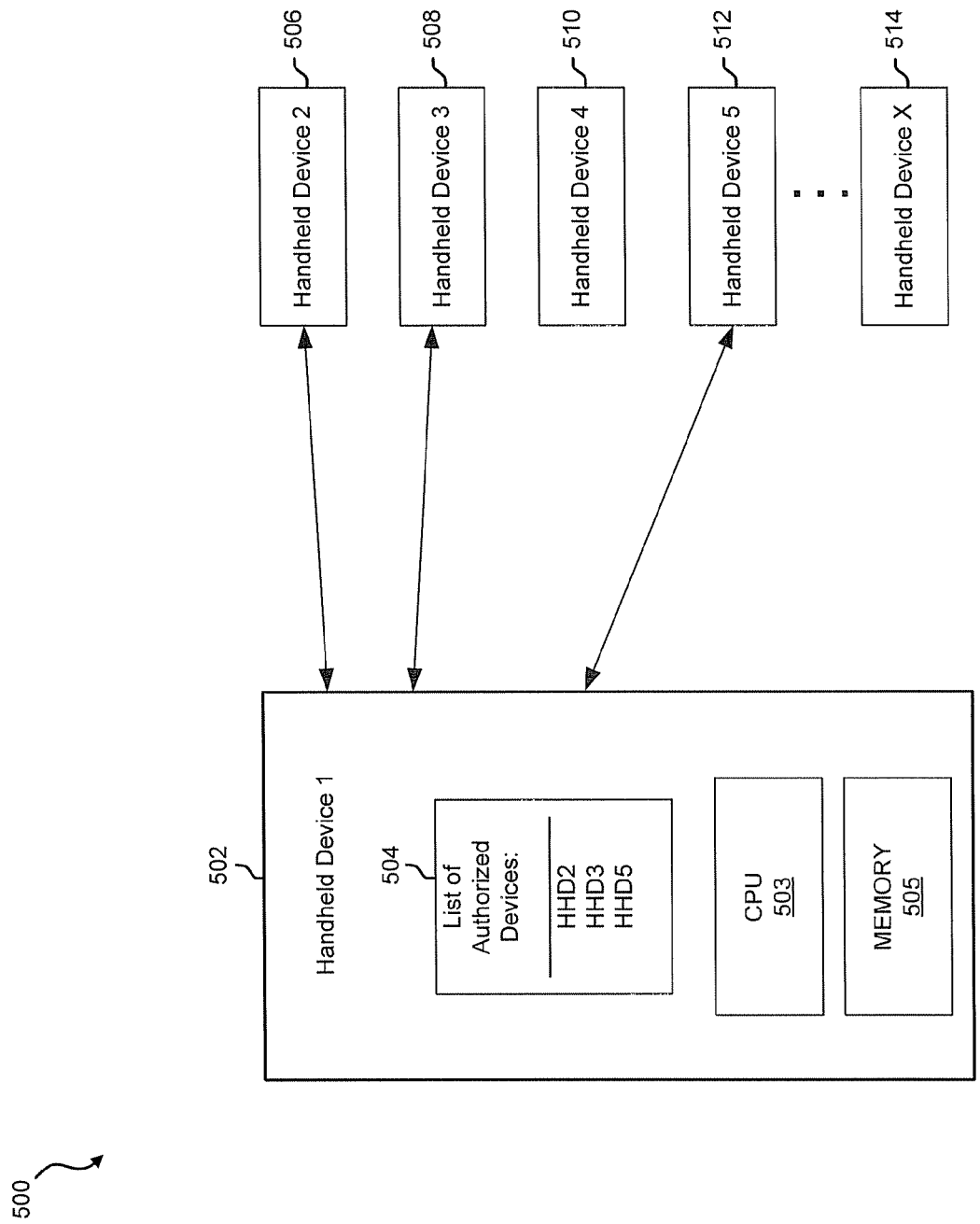
FIG. 5 is a diagram of a handheld communication device in an ad-hoc network utilizing a list of authorized devices, in accordance with an embodiment of the invention.

FIG. 5 is a diagram of a handheld communication device in an ad-hoc network utilizing a list of authorized devices, in accordance with an embodiment of the invention. Referring to FIG. 5, the ad-hoc network 500 may comprise handheld communication devices 502, 506, . . . , 514. The handheld communication devices 502, 506, . . . , 514 may each comprise suitable circuitry, logic, and/or code and may communicate information wirelessly within the ad-hoc network 500. For example, handheld communication devices 502, 506, . . . , 514 may communicate voice or data between each other over extended ranges, without the use of a network device, such as an access point, a base station, a bridge, a router, and/or a switch to facilitate such communication. The extended range may be much greater than the range provided by Bluetooth.

In one embodiment of the invention, the handheld communication device 502 may comprise a CPU 503 and memory 505. The CPU 503 may enable communication of LBRD or voice data, for example, between handheld communication device 502 and one or more handheld communication devices within the ad-hoc network 500. Furthermore, the handheld communication device 502 may maintain a list of authorized devices 504. The list of authorized devices 504 may be stored within the memory 505. In addition, the list of authorized devices 504 may comprise identification information of one or more additional handheld communication devices that may be "pre-authorized" to communicate with the handheld communication device 502, prior to pairing the additional devices with the handheld 502 or prior to establishing any connection or communication between the additional devices and the handheld communication device 502. In instances when a handheld communication device is pre-authorized for communication with handheld communication device 502, an ad-hoc network connection may be established between the pre-authorized handheld communication device and device 502 at the time handheld communication device 502 detects the pre-authorized handheld communication device.

For example, the list of authorized devices 504 may comprise identification information for handheld communication devices 506, 508, and 512. If one or more of the additional handheld communication devices 506, . . . , 514 are within an operating range of handheld communication device 502, handheld communication device 502 may detect the additional devices and may receive identification information from the detected handheld communication devices. For example, handheld communication device may detect that handheld communication devices 506, . . . , 512 are within its operating range. Handheld communication devices 506, . . . , 512 may then communicate identification information to handheld communication device 502. The handheld communication device 502 may then match the received identification information with identification information of "pre-authorized" devices stored within the list of authorized devices 504. Since only handheld communication devices 506, 508, and 512 are pre-authorized, handheld communication device 502 may establish a connection with handheld communication devices 506, 508, and 512. The handheld communication device 502 may deny connection with the handheld communication device 510. In such instance, the handheld communication device 510 may be notified of the denied connection via a text message, for example.

Figure 6:
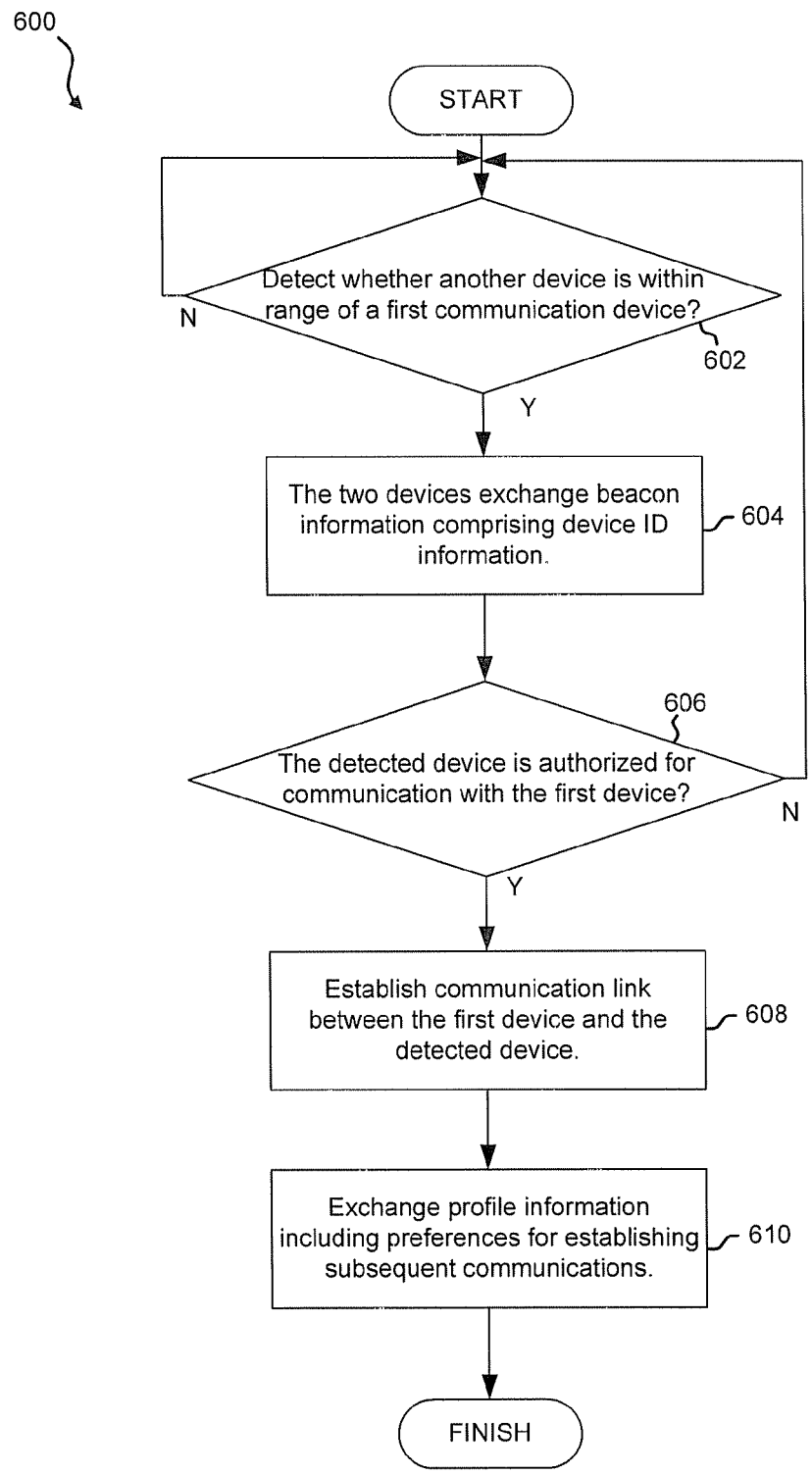
FIG. 6 is a flowchart illustrating exemplary steps for communicating information within a network, in accordance with an embodiment of the invention.

FIG. 6 is a flowchart 600 illustrating exemplary steps for communicating information within a network, in accordance with an embodiment of the invention. Referring to FIGS. 5 and 6, at 602, the handheld communication device 502 may detect whether another handheld communication device is within operating range of the handheld communication device 502. If another handheld communication device, for example handheld communication device 506, is within operating range of the handheld communication device 502, at 604, handheld communication devices 502 and 506 may exchange beacon information, such as device identification information. At 606, the handheld communication device 502 may determine whether the handheld communication device 506 is authorized to communicate with the handheld communication device 502. For example, handheld communication device 502 may match the identification information received from the handheld communication device 506 with identification information stored within the list of authorized devices 504.

If the handheld communication device 506 is not authorized for communicating information with the handheld communication device 502, operation may resume at step 602. If the handheld communication device 506 is authorized for communicating information with the handheld communication device 502, at 608, a communication link may be established between the handheld communication devices 502 and 506. The established communication link may be used to communicate LBRD and/or voice data, for example, between handheld communication devices 502 and 506, without the assistance of an intermediate communication device that comprises a bridging function, a routing function, and/or a switching function. At 610, profile information may be exchanged between the handheld communication devices 502 and 506. The profile information may comprise, for example, preferences for establishing and maintaining subsequent communications, such as preferred time of day and preferred type of information to be exchanged.

Figure 7:
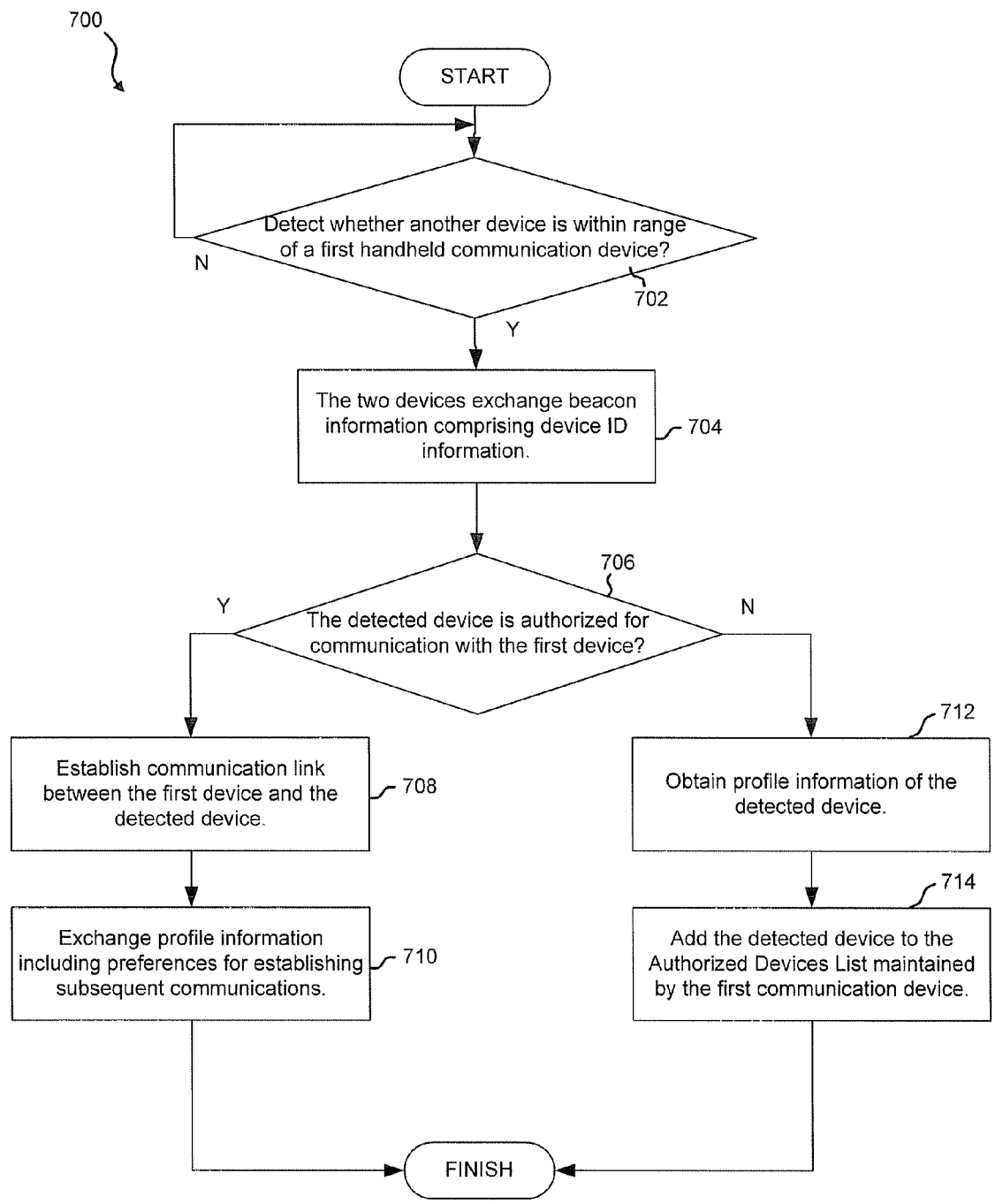
FIG. 7 is a flowchart illustrating exemplary steps for communicating information within a network, in accordance with an embodiment of the invention.

FIG. 7 is a flowchart 700 illustrating exemplary steps for communicating information within a network, in accordance with an embodiment of the invention. Referring to FIGS. 5 and 7, at 702, handheld communication device 502 may detect whether one or more of the handheld communication devices 506, . . . , 514 is within operating range of handheld communication device 502. If one or more of the handheld communication devices 506, . . . , 514, for example handheld communication device 506, is within operating range of handheld communication device 502, the handheld communication devices 502 and 506 may exchange beacon information, such as device identification information. At 706, the handheld communication device 502 may determine whether the handheld communication device 506 is authorized for communicating information with the handheld communication device 502. For example, handheld communication device 502 may match the identification information received from the handheld communication device 506 with identification information stored within the list of authorized devices 504.

If the handheld communication device 506 is authorized to communicate with the handheld communication device 502, at 708, a communication link may be established between the handheld communication devices 502 and 506. At 710, after a communication link is established between the handheld communication devices 502 and 506, profile information may be exchanged between the handheld communication devices 502 and 506. The profile information may comprise, for example, preferences for establishing and maintaining subsequent communications, such as preferred time of day and preferred type of information to be exchanged.

If the handheld communication device 506 is not authorized to communicate information with the handheld communication device 502, at 712, the handheld communication device 502 may request and obtain profile information from the handheld communication device 506. At 714, after handheld communication device 502 receives profile information from the handheld communication device 506 and handheld communication device 506 is approved to communicate with handheld communication device 502, handheld communication device 502 may add handheld communication device 506 to the list of authorized devices 504.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method of communicating information by a communication device, the method comprising:
   detecting, by a first handheld communication device, that a second handheld communication device is within range;
   determining, by said first handheld communication device, whether said second handheld communication device is authorized to communicate with said first handheld communication device, based on a list of authorized devices, which is maintained at said first handheld communication device and created prior to said detecting and any prior communication between said first handheld communication device and said second handheld communication device;
   establishing a direct communication link between said first handheld communication device and said second handheld communication device in response to determining that said second handheld communication device is authorized to communicate with said first handheld communication device, wherein the direct communication link is established without use of an intermediate communication device that facilitates communication between said first handheld communication device and said second handheld communication device; and
   utilizing the direct communication link to exchange preference information for use in establishing or maintaining subsequent communications between said first handheld communication device and said second handheld communication device.

2. The method according to claim 1, wherein said intermediate communication device comprises a network server.

3. The method according to claim 1, comprising determining whether said list of authorized devices comprises said second handheld communication device.

4. The method according to claim 1, comprising, if said second handheld communication device is not authorized, acquiring profile information for said second handheld communication device.

5. The method according to claim 4, comprising displaying said acquired profile information at said first handheld communication device.

6. The method according to claim 4, comprising determining whether to add said non-authorized second handheld communication device to said list of authorized devices, based on said acquired profile information.

7. The method according to claim 4, wherein said acquired profile information comprises at least one of: device identification information or user identification information.

8. The method according to claim 1, wherein said established direct communication link comprises a wireless communication link for communicating at least one of: voice signals, video signals, or data signals.

9. A machine readable storage having stored thereon, a computer program having at least one code section for communicating information by a communication device, the at least one code section being executable by a machine for causing the machine to perform steps comprising:
   detecting, by a first handheld communication device, that a second handheld communication device is within range;
   determining, by said first handheld communication device, whether said second handheld communication device is authorized to communicate with said first handheld communication device, based on a list of authorized devices, which is maintained at said first handheld communication device and created prior to said detecting and any prior communication between said first handheld communication device and said second handheld communication device;
   establishing a direct communication link between said first handheld communication device and said second handheld communication device in response to determining that said second handheld communication device is authorized to communicate with said first handheld communication device, wherein the direct communication link is established without use of an intermediate communication device that facilitates communication between said first handheld communication device and said second handheld communication device; and
   utilizing the direct communication link to exchange preference information for use in establishing or maintaining subsequent communications between said first handheld communication device and said second handheld communication device.

10. The machine-readable storage according to claim 9, wherein said intermediate communication device comprises a network server.

11. The machine-readable storage according to claim 9, comprising code for determining whether said list of authorized devices comprises said second handheld communication device.

12. The machine-readable storage according to claim 9, comprising code for acquiring profile information for said second handheld communication device, if said second handheld communication device is not authorized.

13. The machine-readable storage according to claim 12, comprising code for displaying said acquired profile information at said first handheld communication device.

14. The machine-readable storage according to claim 12, comprising code for determining whether to add said non-authorized second handheld communication device to said list of authorized devices, based on said acquired profile information.

15. The machine-readable storage according to claim 12, wherein said acquired profile information comprises at least one of: device identification information or user identification information.

16. The machine-readable storage according to claim 9, wherein said established direct communication link comprises a wireless communication link for communicating at least one of: voice signals, video signals, or data signals.

17. A system of communicating information by a communication device, the system comprising:
   at least one processor within a first handheld communication device, that enables detection of a second handheld communication device that is within range of said first handheld communication device;
   said at least one processor within said first handheld communication device enables determination of whether said second handheld communication device is authorized to communicate with said first handheld communication device, based on a list of authorized devices, which is maintained at said first handheld communication device and created prior to said detecting and any prior to communication between said first handheld communication device and said second handheld communication device;
   said at least one processor configured to establish a direct communication link between said first handheld communication device and said second handheld communication device in response to a determination that said second handheld communication device is authorized to communicate with said first handheld communication device, wherein the direct communication link is established without use of an intermediate communication device that facilitates communication between said first handheld communication device and said second handheld communication device; and said at least one processor configured to utilize the direct communication link to exchange preference information for use in establishing or maintaining subsequent communications between said first handheld communication device and said second handheld communication device.

18. The system according to claim 17, wherein said intermediate communication device comprises a network server.

19. The system according to claim 17, wherein said at least one processor enables determination of whether said list of authorized devices comprises said second handheld communication device.

20. The system according to claim 17, wherein said at least one processor enables acquiring of profile information for said second handheld communication device, if said second handheld communication device is not authorized.

21. The system according to claim 20, wherein said at least one processor enables displaying of said acquired profile information at said first handheld communication device.

22. The system according to claim 20, wherein said at least one processor enables determination of whether to add said non-authorized second handheld communication device to said list of authorized devices, based on said acquired profile information.

23. The system according to claim 20, wherein said acquired profile information comprises at least one of: device identification information or user identification information.

24. The system according to claim 17, wherein said established direct communication link comprises a wireless communication link for communicating at least one of: voice signals, video signals, or data signals.

* * * * *